(12) United States Patent
Takeuchi

(10) Patent No.: US 8,327,208 B2
(45) Date of Patent: Dec. 4, 2012

(54) TIME-DIVISION DUPLEX TRANSMIT-RECEIVE APPARATUS

(75) Inventor: Yoshihiko Takeuchi, Tokyo (JP)

(73) Assignee: Japan Radio Co., Ltd., Tokyo (JP)

( * ) Notice: Subject to any disclaimer, the term of this patent is extended or adjusted under 35 U.S.C. 154(b) by 393 days.

(21) Appl. No.: 12/741,386

(22) PCT Filed: Nov. 5, 2008

(86) PCT No.: PCT/JP2008/003189
§ 371 (c)(1),
(2), (4) Date: May 5, 2010

(87) PCT Pub. No.: WO2009/060598
PCT Pub. Date: May 14, 2009

(65) Prior Publication Data
US 2010/0251050 A1     Sep. 30, 2010

(30) Foreign Application Priority Data

Nov. 5, 2007  (JP) ................................. 2007-286945

(51) Int. Cl.
*G06F 11/00* (2006.01)
(52) U.S. Cl. ...................................................... 714/746
(58) Field of Classification Search ................... 714/746
See application file for complete search history.

(56) References Cited

U.S. PATENT DOCUMENTS

| | | | |
|---|---|---|---|
| 6,708,020 B1 | 3/2004 | Hiramatsu et al. | |
| 6,735,812 B2 | 5/2004 | Hekman et al. | |
| 7,058,425 B1 | 6/2006 | Takakusaki | |
| 2004/0171408 A1 | 9/2004 | Maruta | |
| 2010/0095180 A1 * | 4/2010 | Sawai ........................... | 714/746 |

FOREIGN PATENT DOCUMENTS

| | | |
|---|---|---|
| JP | 2001-053663 | 2/2001 |
| JP | 2002-084219 | 3/2002 |
| JP | 2002-330083 | 11/2002 |
| JP | 2003-218760 | 7/2003 |
| JP | 2003-244044 | 8/2003 |
| JP | 2003-309510 | 10/2003 |
| JP | 2003-332969 | 11/2003 |
| JP | 2003-338772 | 11/2003 |
| JP | 2004-260373 | 9/2004 |

OTHER PUBLICATIONS

Japanese International Search Report dated Jan. 21, 2009.

* cited by examiner

*Primary Examiner* — Bryce Bonzo
(74) *Attorney, Agent, or Firm* — Venable LLP; Jeffri A. Kaminski

(57) ABSTRACT

There is provided a time-division duplex transmit-receive apparatus in which the respective amplitude and phase characteristics of N sets of transmitting unit-receiving unit pair connected with N antenna elements are corrected all together and at the same time. At the time of reception, the reference signal from reference signal generator is branched into N reference signals. The branched reference signal is applied to the reception system through the transmit-receive switching switch. The reception-side error detector detects the error between the output signal of the reception-side amplitude-phase correction circuit and the reference signal to control the reception-side amplitude-phase correction circuit so that the error becomes zero. At the time of transmission, a part of transmitting signal is applied to the reception system through the antenna path. The transmission-side error detector detects the error between the output signal of the reception-side amplitude-phase correction circuit and the transmitting signal to control the transmission-side error detector so that the error becomes zero.

7 Claims, 6 Drawing Sheets

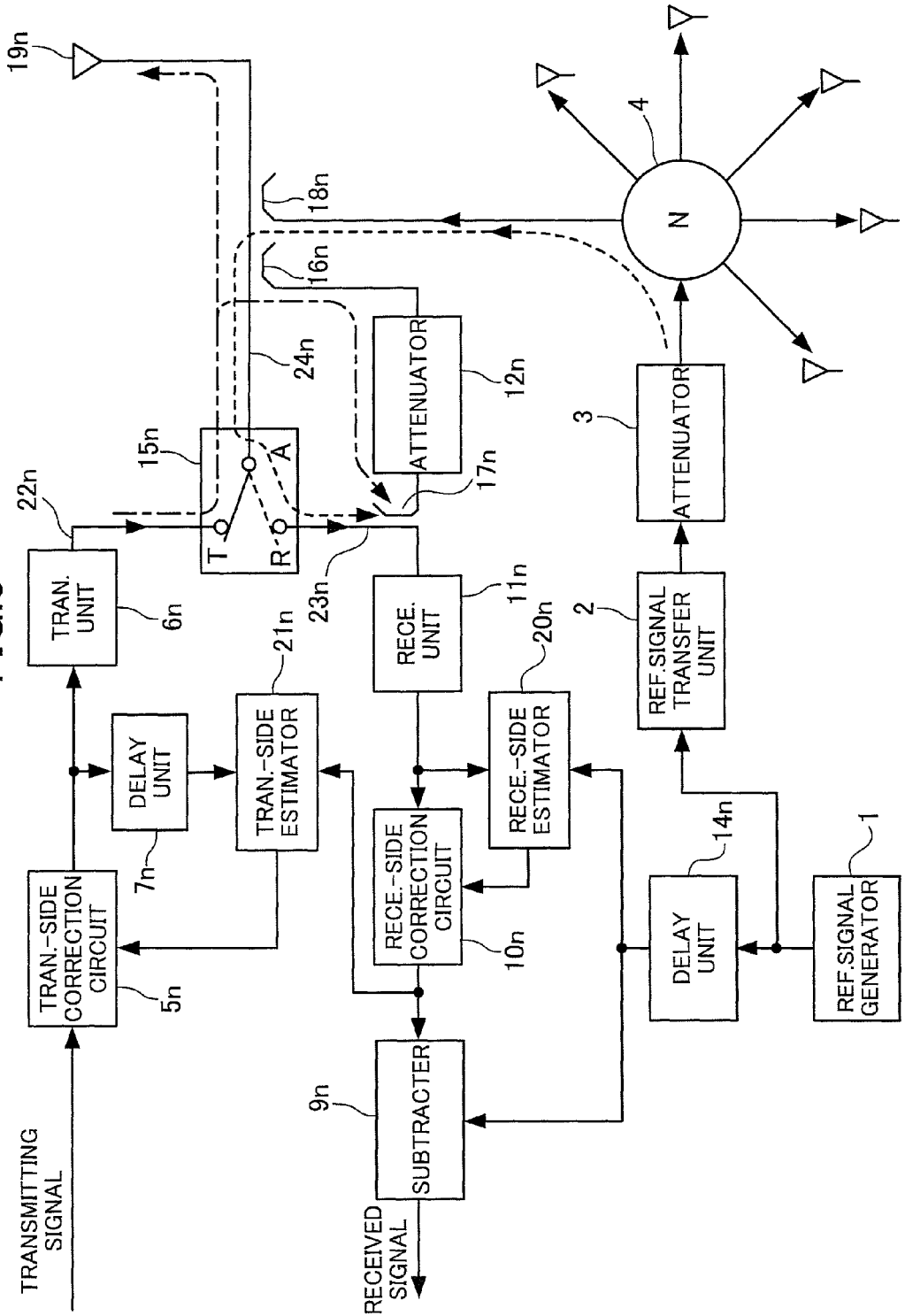

TIME-DIVISION DUPLEX TRANSMIT-RECEIVE APPARATUS

TECHNICAL FIELD

The present invention relate generally to a time-division duplex transmit-receive apparatus, and particularly to a time-division duplex transmit-receive apparatus for carrying out transmission and reception in a time-divisional manner using an antenna array, which comprises correction means for allowing all of transmitting units and receiving units to have the same amplitude and phase characteristics by correcting the dispersions of amplitude and phase characteristics of the transmitting unit and receiving unit corresponding to each antenna element of the antenna array.

BACKGROUND ART

FIG. 1 shows the block diagram illustrating the conventional time-division duplex transmit-receive apparatus having the correction means. The conventional transmit-receive apparatus comprises an antenna array constituted by N (N is an integer equal to or larger than two) antenna elements. Each antenna element is accompanied by a set of transmitting unit-receiving unit pair.

It is now assumed that $T_i$ shows amplitude and phase characteristics of the ith transmitting unit (i is an integer of $1 \leq i \leq N$) and $R_i$ amplitude and phase characteristics of the ith receiving unit. The amplitude and phase characteristics $K_i$ of the ith set of transmitting unit-receiving unit pair during a transmit-receive operation can be represented by the following formula 1 in the case that transmit-receive patterns are caused to be matched to each other.

$$K_i = R_i/T_i \quad \text{(Formula 1)}$$

A given set of transmitting unit-receiving unit pair is selected as a reference set, and the amplitude and phase characteristics of each of the other sets of transmitting unit-receiving unit pair during transmit-receive operation are each determined independently to obtain the relative difference of the determined amplitude and phase characteristics with respect to the amplitude-phase characteristics of the reference set, thereby making it possible to correct the amplitude-phase characteristics of respective sets of transmitting unit-receiving unit pair. If the first set of transmitting unit-receiving unit pair (on leftmost side in the figure) is selected as a reference set, for example, then the correction value $H_i$ for the ith set of transmitting unit-receiving unit pair can be obtained by the following formula 2.

$$H_i = /K_i = /T_i)/(R_1/T_1) = T_1/T_iR_1 \quad \text{(Formula 2)}$$

That is, if the product of the amplitude-phase characteristic of the transmitting unit in the first set as a reference one and the amplitude-phase characteristic of the receiving unit in the ith set, and the product of the amplitude-phase characteristic of the transmitting unit in the ith set and the amplitude-phase characteristic of the receiving unit in the first set is known, then the correction value Hi for the ith set of transmitting unit-receiving unit pair can be obtained.

The transmission and reception in the conventional transmit-receive apparatus shown in FIG. 1 are carried out alternately in a time-division manner for time sequence as illustrated in a time sequence (a) of FIG. 2. It is also illustrated in a time sequence (b) of FIG. 2 that respective amplitude and phase characteristics of sets of transmitting unit-receiving unit pair are corrected in turn at the time of transmission.

In the conventional transmit-receive apparatus, the terminal A of the first switch SW1-$i$ ($1 \leq i \leq N$) of the ith set is connected with the terminal T at the time of transmission to radiate transmission power from the transmitting unit T-i through the branching circuit D-i to space by the antenna element AN-$i$.

The terminal R of the first switch SW1-$i$ is connected with the terminal S of the forth switch SW4-$i$, and the terminal R of the forth switch SW4-$i$ is connected with the receiving unit R-i. In the forth switch SW4-$i$, the terminal R is connected with the terminal A at the time of transmission.

On the other hand, from the branching circuit D-1 of the first set as a reference one, the transmission power from the transmitting unit T-1 is sent to the terminal P of the second switch SW2. The terminals $C_2$ to $C_N$ of the second switch SW2 are connected with the terminals A of the fourth switches SW4-2 to SW4-N, respectively.

The branching circuits D-2 to D-N receive the transmission powers from the transmitting units T-2 to T-N, respectively. The transmission powers are subsequently sent to not only the antenna elements AN-2 to AN-N but also the terminals $C_2$ to $C_N$ of the third switch SW3, respectively. The terminal P of the third switch SW3 is connected with the terminal A of the fourth switch SW4-1 of the first set.

The switches SW2 and SW3 are operated in an interlocking manner. That is, the switches SW2 and SW3 are respectively switched toward the terminals $C_2$ at the time of first transmission, toward the terminal $C_3$ at the time of second transmission, toward the terminal $C_3$ at the time of third transmission, . . . , toward the terminal $C_N$ at the time of (N−1)th transmission.

According to the connection structures of the switches and the switching operations thereof described above, it is understood that at the time of first transmission, a part of the transmission power from the transmitting unit T-1 of the first set is applied to the receiving unit R-2 of the second set through the branching circuit D-1, the terminals P-$C_2$ of the second switch SW2, and the terminals A-R of the fourth switch SW4-2 of the second set, while a part of the transmission power from the transmitting unit T-2 of the second set is applied to the receiving unit R-1 of the first set through the branching circuit D-2, the terminals $C_2$-P of the third switch SW3, and the terminals A-R of the fourth switch SW4-1 of the first set.

At the time of second transmission, a part of the transmission power from the transmitting unit T-1 of the first set is applied to the receiving unit R-3 of the third set through the branching circuit D-1, the terminals P-$C_3$ of the second switch SW2, and the terminals A-R of the fourth switch SW4-3 of the third set, while a part of the transmission power from the transmitting unit T-3 of the third set is applied to the receiving unit R-1 of the first set through the branching circuit D-3, the terminals $C_3$-P of the third switch SW3, and the terminals A-R of the fourth switch SW4-1 of the first set.

In the same way, at the time of (N−1)th transmission, a part of the transmission power from the transmitting unit T-1 of the first set is applied to the receiving unit R-N of the Nth set through the branching circuit D-1, the terminals P-$C_N$ of the second switch SW2, and the terminals A-R of the fourth switch SW4-N, while a part of the transmission power from the transmitting unit T-N of the Nth set is applied to the receiving unit R-1 of the first set through the branching circuit D-N, the terminals $C_N$-P of the third switch SW3, and the terminal A-R of the fourth switch SW4-1 of the first set.

In this manner, $T_1R_i$ and $T_iR_1$ in the formula 2 can be known by determining the output signals of the respective receiving units after applying the transmission power from the transmitting unit of the first set to the receiving unit of the ith set, and applying the transmission power from the transmitting unit of the ith set to the receiving unit of the first set. Therefore, the output signals of respective receiving unit R-i are applied to the arithmetic circuit 30 to calculate the amplitude and phase characteristics correcting values, thereby obtaining the correction value $H_i$ in the formula 2. Using the correction value $H_i$, the arithmetic circuit 40 calculates weighting factors for correction. The amplitude and phase characteristics of the transmitting unit T-i of the ith set can be corrected by the weighting factors thus obtained, thereby making it possible to eliminate the dispersions of amplitude and phase characteristics between the sets of transmitting unit-receiving unit pair to have respective transmission and reception patterns conformed (see Japanese Patent Publication No. 2000-216618, paragraphs 0031 to 0047, FIGS. 2, 7, 14, for example). In FIG. 1, reference numeral 50 indicates the directionality control and arithmetic circuit.

DISCLOSURE OF INVENTION

Problems to be Solved

According to the conventional time-division duplex transmit-receive apparatus having correction means, in the case that the apparatus comprises N sets of transmitting unit-receiving unit pair one set thereof is selected as a reference set, the amplitude and phase characteristics of each of the other (N−1) sets are corrected in such a manner that each set is corrected during one transmission time interval. As a result, one cycle of corrections are completed after the transmission operations have been carried out (N−1) times. This means that the conventional apparatus has the condition such that some sets for which the corrections have been completed and other sets for which the corrections are not yet completed are existed during one cycle of corrections. Such condition is not preferable for the operation of the apparatus.

Also, as apparent from the construction of the conventional apparatus shown in FIG. 1, many switches are used in a high frequency area to carry out the corrections, such as one second switch SW2, one third switch SW3, and N fourth switches SW4. The fact that such many switches are utilized in a high frequency area lease to the problems such that these switches themselves tend to cause the dispersions of the amplitude and phase characteristics. Further, in spite that the switching operations of respective switches should be carried out at the same time, the operation times thereof are dispersed in fact, which leads to additional problems.

An object of the present invention is, therefore, to provide a time-division duplex transmit-receive apparatus comprising means for correcting all of the amplitude and phase characteristics of multiple sets of transmitting unit-receiving unit pair at the same time without using the switches used in the conventional apparatus.

Solution to Problem

A time-division duplex transmit-receive apparatus according to the present invention comprises an array antenna constituted by N antenna elements (N is an integer equal to or more than 2), N sets of transmitting unit-receiving unit pair connected to the N antenna elements, respectively, and correction means for correcting the N sets of transmitting unit-receiving unit pair at the same time so that the respective amplitude and phase characteristics of reception systems in the N sets of transmitting unit-receiving unit pair become the same, and for correcting the N sets of transmitting unit-receiving unit pair at the same time so that the respective amplitude and phase characteristics of transmission systems in the N sets of transmitting unit-receiving unit pair become the same.

According to the present invention, it is preferable that the correction means includes reception system correcting means for correcting the N sets of transmitting unit-receiving unit pair at the same time so that respective amplitude and phase characteristics of reception systems in the N sets of transmitting unit-receiving unit pair become the same, and transmission system correcting means for correcting the N sets of transmitting unit-receiving unit pair at the same time so that respective amplitude and phase characteristics of transmission systems in the N sets of transmitting unit-receiving unit pair become the same. It is also preferable that each of the N sets of transmitting unit-receiving unit pair includes a transmit-receive switching switch for switching between the transmission system and the reception system to connect with the antenna element.

Advantageous Effects of Invention

The time-division duplex transmit-receive apparatus of the present invention comprises correction means for correcting the N sets of transmitting unit-receiving unit pair at the same time so that respective amplitude and phase characteristics of reception systems in the N sets of transmitting unit-receiving unit pair become the same, and for correcting the N sets of transmitting unit-receiving unit pair at the same time so that respective amplitude and phase characteristics of transmission systems in the N sets of transmitting unit-receiving unit pair become the same. Therefore, the respective amplitude and phase characteristics of the N sets of transmitting unit-receiving unit pair are corrected all together and at the same time. As a result, the condition is not occurred such that some sets for which the corrections have been completed and other sets for which the corrections are not yet completed are existed during one cycle corrections like in the conventional apparatus.

Also, in the time-division duplex transmit-receive apparatus of the present invention, the correction means is structured so that the respective amplitude and phase characteristics of the N sets of transmitting unit-receiving unit pair are corrected all together and at the same time. Therefore, it is not required that many switches are used in a high frequency area like in the conventional apparatus. As a result, the dispersions of the amplitude and phase characteristics due to many switches are not caused.

BRIEF DESCRIPTION OF DRAWINGS

FIG. 6 shows a block diagram illustrating the fourth embodiment of the transmit-receive apparatus according to the present invention.

BEST MODE FOR CARRYING OUT THE INVENTION

A time-division duplex transmit-receive apparatus according to the present invention comprises an array antenna constituted by N antenna elements (N is an integer equal to or more than 2), N sets of transmitting unit-receiving unit pair connected to the N antenna elements, respectively, and correction means for correcting the N sets of transmitting unit-receiving unit pair at the same time so that respective amplitudes and phases of reception systems in transmitting unit-receiving unit pairs become the same, and for correcting the N sets of transmitting unit-receiving unit pair at the same time so that respective amplitudes and phases of transmission systems of transmitting unit-receiving unit pairs become the same.

According to the present invention, the correction means can be implemented in various manners. Embodiments having different types of correction means will now be described hereinafter.

First Embodiment

Figure 3:
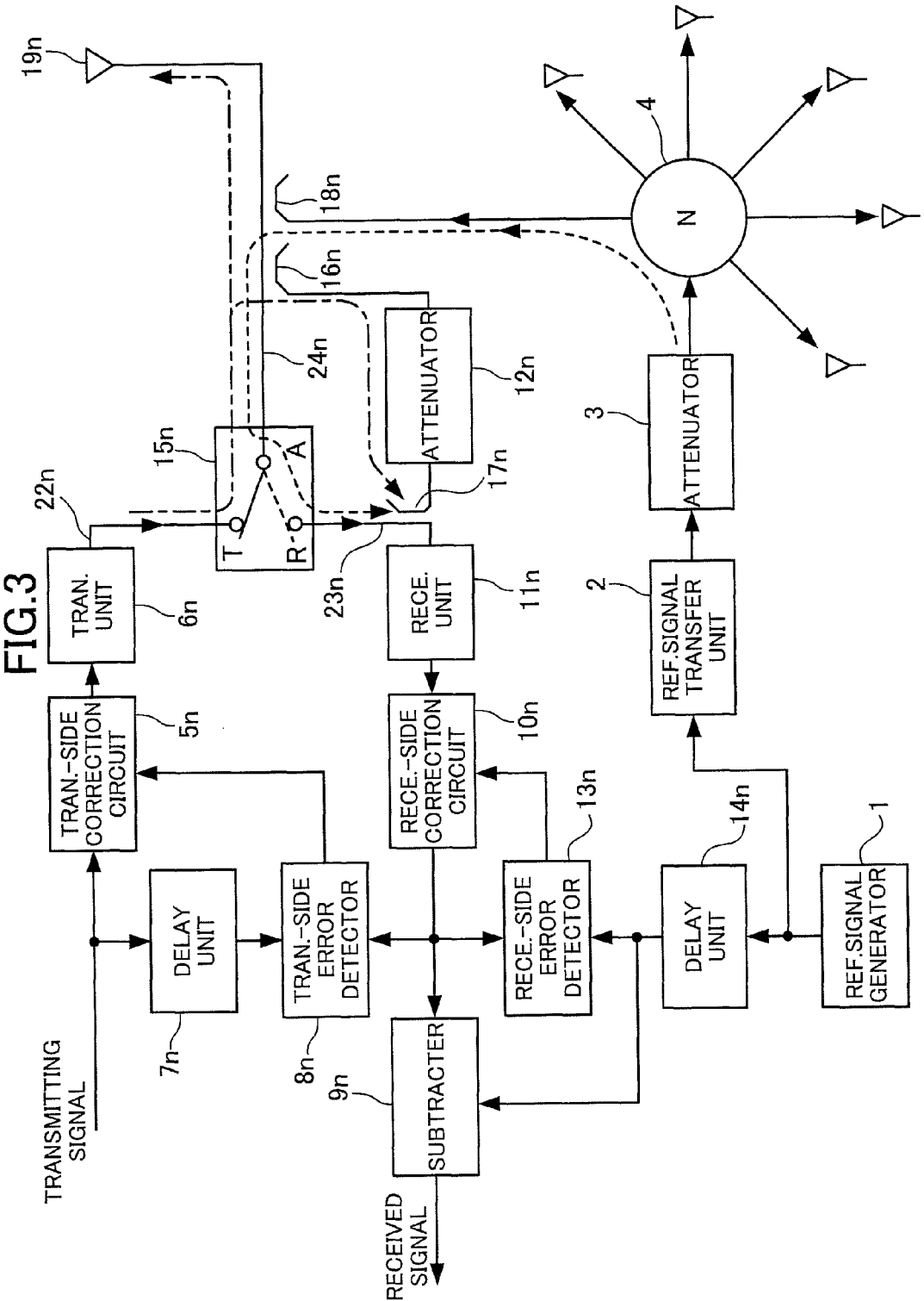
FIG. 3 is a block diagram illustrating the first embodiment of the transmit-receive apparatus according to the present invention.

FIG. 3 shows the block diagram illustrating the first embodiment of the transmit-receive apparatus according to the present invention. The transmit-receive apparatus comprises N antenna elements, and N sets of transmitting unit-receiving unit pair connected to the N antenna elements, respectively. For sake of simplicity of the drawing, there are shown only one antenna element and one set of transmitting unit-receiving unit pair connected to one antenna element. In the figure, suffix "n" attached to reference numerals indicates nth component among N components, herein n=1, 2, . . . , N. Reference numeral not accompanied by suffix refers to only one element provided in the entire construction of the apparatus.

To an antenna element 19*n*, connected is an antenna transfer path 24*n*. A transmission system including a transmitting unit 6*n*, and a reception system including a receiving unit 11*n* are connected in parallel to the antenna transfer path 24*n* through a transmit-receive switching switch 15*n* for switching between transmission and reception.

The apparatus further comprises a reference signal generator 1 for generating a reference signal for amplitude-phase correction in respective reception systems, a reference signal transfer unit 2 for amplifying and transferring the received reference signal, an attenuator 3 for attenuating and adjusting the reference signal from the reference signal transfer unit 2, and an N-branching circuit for branching the reference signal from the attenuator 3 into N reference signals and applying the branched reference signals to a directional coupler 18*n* of respective sets of transmitting unit-receiving unit pair.

Each transmission system is provided with a transmission-side amplitude-phase correction circuit 5*n* having an input terminal to which a transmitting signal is applied, the output terminal thereof is connected to the transmitting unit 6*n*. Also, the reception system is provided with a reception-side amplitude-phase correction circuit 10*n* having an output terminal, the input terminal thereof is connected to the receiving unit 11*n*.

Figure 1:
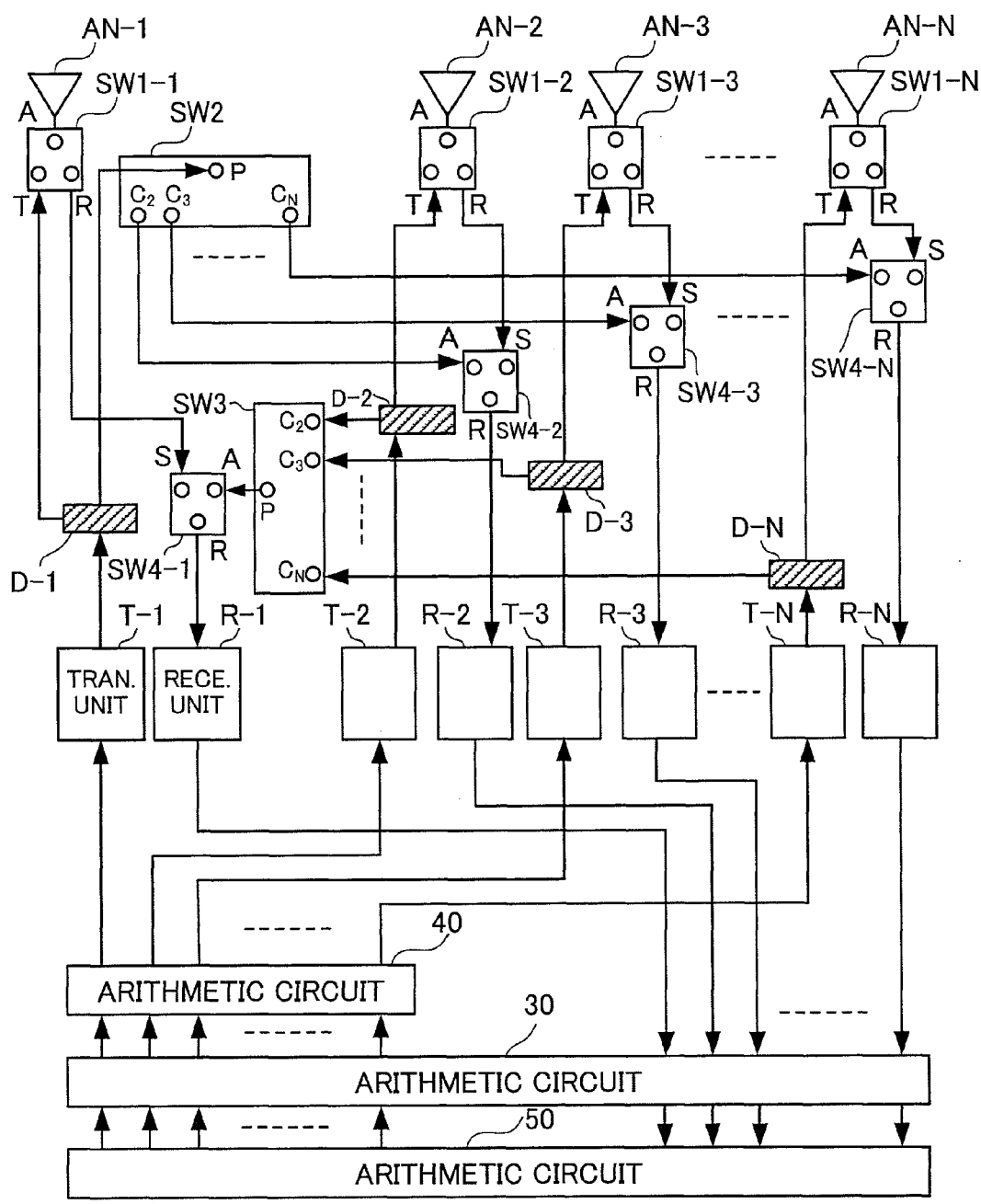
FIG. 1 is a block diagram illustrating the conventional transmit-receive apparatus.
Figure 2:
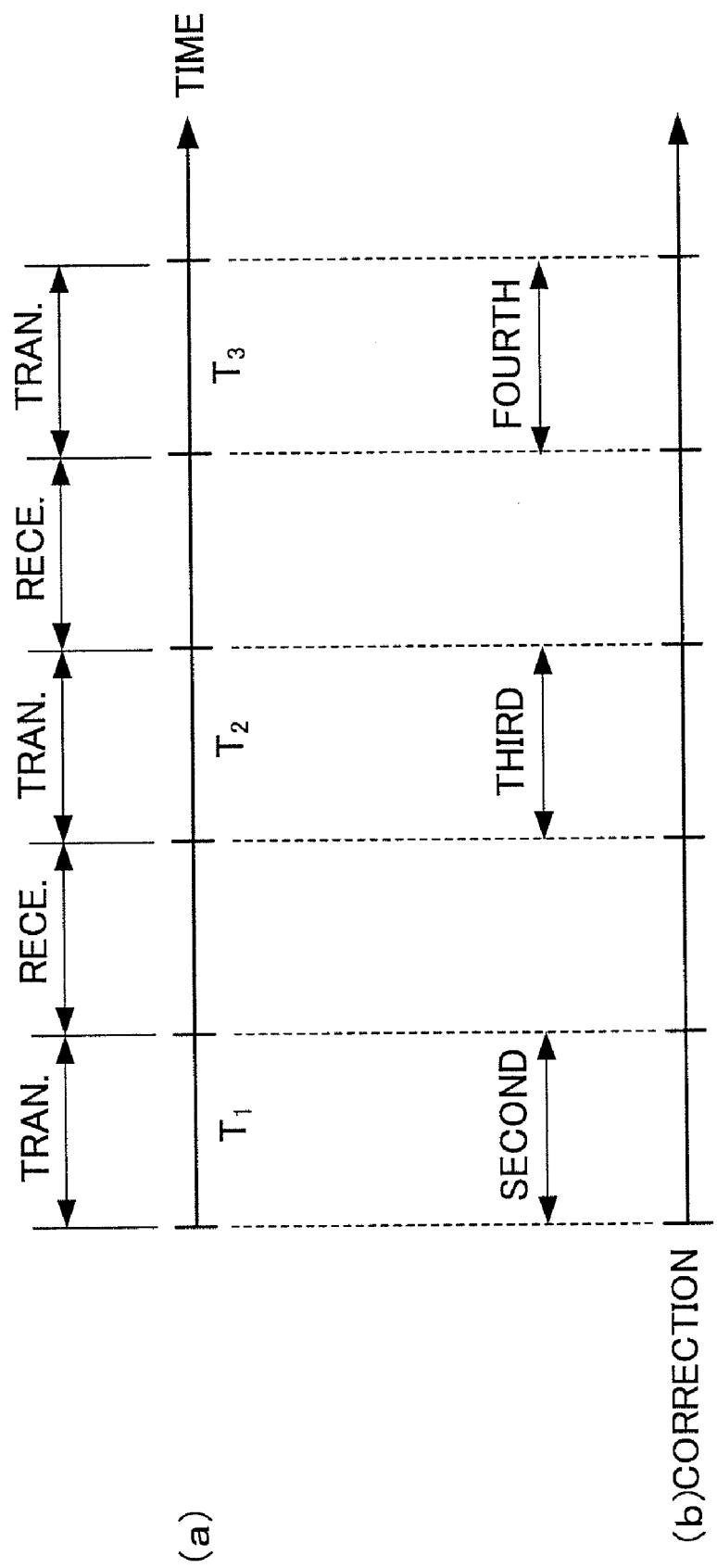
FIG. 2 is a time sequence diagram for explaining time-divisional transmission and reception, and a correction sequence in the conventional apparatus.

The transmission and reception of the transmit-receive apparatus thus constructed is based on a time-division in which transmission and reception are carried out alternately over time as shown in the time sequence (a) of FIG. 2. In the transmit-receive switching switch 15*n* for switching between transmission and reception, a terminal A is connected with a terminal T at the time of transmission, and the terminal A is connected with a terminal R at the time of reception.

In the transmit-receive apparatus according to the present embodiment, the correction for the reception system is implemented at the time of reception, and the correction for the transmission system is implemented at the time of transmission. First, the correction for the reception system will be explained.

At the time of reception, the terminal A is connected with the terminal R in the transmit-receive switching switch 15*n*. The reference signal generated in the reference signal generator 1 is amplified in the reference signal transfer unit 2, and is adjusted in level in the attenuator 3. The reference signal thus adjusted is branched into N reference signals by the N-branching circuit 4. One of N branched reference signals is applied to the directional coupler 18*n* provided in an antenna transfer path 24*n* of the transmitting unit-receiving unit pair, and is sent to the antenna transfer path 24*n* through the directional coupler 18*n*.

Hereinafter, the correction for reception system in the nth set of transmitting unit-receiving unit pair will be representatively explained. The branched reference signal is applied to the receiving unit 11*n* through the antenna transfer path 24*n*, the terminals A-R of the transmit-receive switching switch 15*n*, and the reception path 23*n*. The branched reference signal amplified by the receiving unit 11*n* is applied to the reception-side amplitude-phase correction circuit 10*n*. The branched reference signal outputted from the reception-side amplitude-phase correction circuit 10*n* is applied into one input terminal of a reception-side error detector 13*n*. To the other input terminal of the reception-side error detector 13*n*, applied is the reference signal outputted from the reference signal generator 1 through a delay unit 14*n*.

The delay time provided by the delay unit 14*n* is set so as to be equal to the delay time caused during the branched reference signal is transferred from the output terminal of the reference signal generator 1 to the output terminal of the reception-side amplitude-phase correction circuit 10*n* through the reception system. The reception-side error detector 13*n* detects respective errors in amplitudes and phases of the reference signals received in two input terminals thereof to generate a control signal based on the detected errors. The control signal is applied to the reception-side amplitude-phase correction circuit 10*n*. The correction circuit 10*n* corrects the amplitude and phase characteristics thereof so that the detected errors become zeros in the reception-side error detector 13*n*. In this manner, the feedback control for the amplitude and phase characteristics of the correction circuit 10*n* is carried out.

In this manner, the amplitudes and phases of the signals on the output terminals of the respective reception-side amplitude-phase correction circuits 10*n* in N reception systems are corrected all together and at the same time so as to become the same on the basis of the reference signal generated in the reference signal generator 1.

The operation of correction described above is carried out in parallel with the reception of the signal from the antenna element 19*n*. Accordingly, the branched reference signal is mixed with the received signal in the path from the directional coupler 18*n* to the output terminal of the reception-side amplitude-phase correction circuit 10*n*. The mixed reference signal is, however, an undesirable signal for the signal received by the antenna element, so that the mixed reference signal is required to be removed from the signal outputted from the correction circuit 10*n*. For this purpose, the output signal of the reception-side amplitude-phase correction circuit 10*n* is applied to one input terminal of a subtracter 9*n*, to the other input terminal thereof applied is the delayed reference signal from the delay unit 14. In the subtracter 9$n$, the delayed reference signal is subtracted from the output signal of the reception-side amplitude-phase correction circuit 10$n$, the output signal including the mixed reference signal. In this manner, the mixed reference signal is removed from the output signal of the reception-side amplitude-phase correction circuit 10$n$, so that the output signal of the subtracter 9$n$ includes only the received signal.

Secondly, the correction for the transmission system will now be explained. Hereinafter, the correction for the transmission system in the nth set of transmitting unit-receiving unit pair will be representatively explained as well as the correction for the reception system.

The correction for the transmission system is implemented by the transmitting signal itself at the time of transmission. At the time of transmission, the transmit-receive switching switch 15$n$ has the terminal A connected to the terminal T. The correction is carried out utilizing the reception system for which the correction has already been completed.

As the correction is carried out at the time of transmission during which the signal is not received, a part of transmitting signal can be transferred to the reception system. The transmitting signal is, first, inputted to the transmission-side amplitude-phase correction circuit 5$n$, and the output signal thereof is outputted to the transmitting unit 6$n$. The output signal of the transmitting unit 6$n$ is radiated to space from the antenna element 19$n$ through the terminals T-A of the transmit-receive switching switch 15$n$ and the antenna transfer path 24$n$. A part of the transmitting signal is derived by a directional coupler 16$n$ provided in the antenna transfer path 24$n$ during the transmitting signal is transferred therethrough. The derived signal is attenuated in the attenuator 12$n$, then applied to the reception path 23$n$ through a directional coupler 17$n$ provided therein, and finally applied to the receiving unit 11$n$.

The output signal of the receiving unit 11$n$ passes through the reception-side amplitude-phase correction circuit 10$n$ for which the correction has been completed, and is applied to one input terminal of a transmission-side error detector 8$n$. To the output terminal of the transmission-side error detector 8$n$, applied is the transmitting signal delayed by a delay unit 7$n$. The delay time provided by the delay unit 7$n$ is set so as to be equal to the delay time caused during the transmitting signal is transferred from the input terminal of the transmission-side amplitude-phase correction circuit 5$n$ to the output terminal of the reception-side amplitude-phase correction circuit 10$n$ through the described-above path for transmitting signal.

The transmission-side error detector 8$n$ to which two signals are respectively applied from the reception-side amplitude-phase correction circuit 10$n$ and the delay unit 7$n$ detects the respective errors in amplitude and phase of the two signals to generate a control signal based on the detected errors. The control signal is applied to the transmission-side amplitude-phase correction circuit 5$n$. The correction circuit 5$n$ correct the amplitude and phase characteristics thereof so that the detected errors become zeros in transmission-side error detector 8$n$. In this manner, the feedback control for the amplitude and phase characteristics of the correction circuit 5$n$ is carried out.

As a result, it can be seen that the respective amplitude and phase characteristics of the transfer path from the input terminal of the transmission-side amplitude-phase correction circuit 5$n$ to the output terminal of the reception-side amplitude-phase correction circuit 10$n$ in the N sets of transmitting unit-receiving unit pair are the same. The respective amplitude and phase characteristics of the transfer path from the reception path 23$n$ to the reception-side amplitude-phase correction circuit 10$n$ through the receiving unit 11$n$ in the N reception systems have been the same because of the correction at the time of reception. Therefore, the respective amplitude and phase characteristics of the transfer path from the input terminal of the transmission-side amplitude-phase correction circuit 5$n$ to the transmission path 22$n$ through the transmitting unit 6$n$ in the N sets of transmitting unit-receiving unit pair become the same.

As described above, the respective amplitude and phase characteristics of the reception system in the N sets of transmitting unit-receiving unit pair become the same, and the respective amplitude and phase characteristics of the transmission system in the N sets of transmitting unit-receiving unit pair become the same.

In the transmit-receive apparatus according to the present embodiment, while the output signal from the reference signal transfer unit 2 which amplifies and transfers the reference signal from the reference signal generator 1 is branched into N reference signals by the N-branching circuit 4 to be applied to the respective directional couplers provided in the N antenna transfer paths, it is desirable that the respective amplitude and phase characteristics of the transfer paths from the N-branching circuit 4 to the respective directional couplers 18$n$ are the same. For this purpose, the transmit-receive apparatus is required to be structured so that the respective distances from the N-branching circuit 4 to the directional couplers 18$n$ are the same. It is preferable for such structure that the N antenna elements to constitute the array antenna are arranged in a circle in the center thereof the N-branching circuit 4 is positioned.

It is also preferable that respective routings of the transmission paths, reception paths, and antenna transfer paths in the N sets of transmitting unit-receiving unit pair are the same, and respective positions of the transmit-receive switching switches in the N sets of transmitting unit-receiving unit pair are the same.

It is further preferable that the attenuator 3 provided between the reference signal transfer unit 2 and the N-branching circuit 4 is of variable type for level adjustment of the reference signal, while the N attenuators 12$n$ are of non-variable type so as to have the same amount of attenuation, respectively.

Second Embodiment

Figure 4:
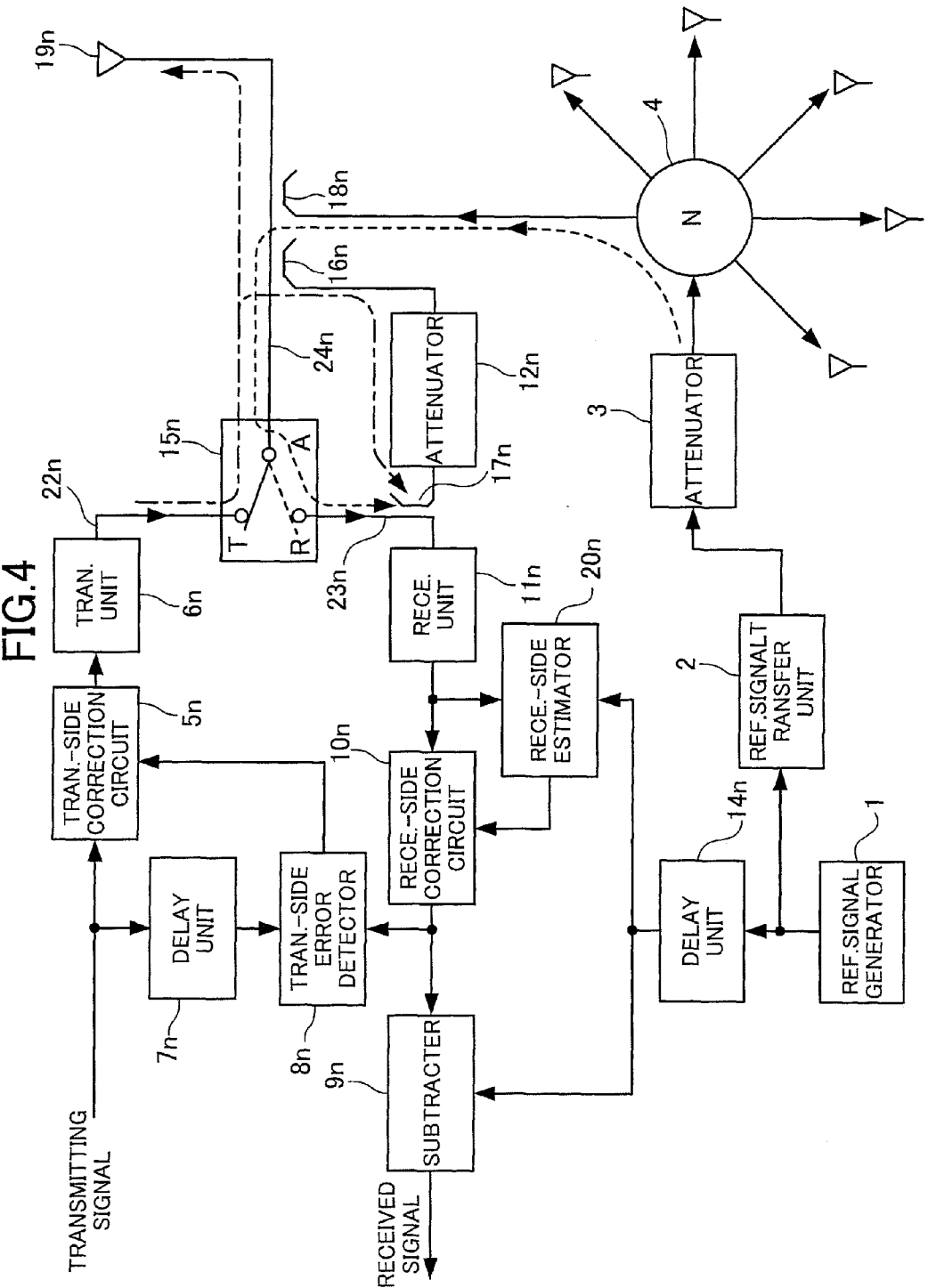
FIG. 4 is a block diagram illustrating the second embodiment of the transmit-receive apparatus according to the present invention.

FIG. 4 shows the block diagram illustrating the second embodiment of the transmit-receive apparatus according to the present invention. The present embodiment is different from the first embodiment shown in FIG. 3 in that a reception-side correction value estimator 20$n$ is used in place of the reception-side error detector 13$n$. To one terminal of the estimator 20$n$, applied is the output signal from the receiving unit 11$n$, which is also the input signal to the reception-side amplitude-phase correction circuit 10$n$. The reception-side correction value estimator 20$n$ detects the differences in amplitude and phase between the output signal from the receiving unit 11$n$ and the reference signal from the delay unit 14$n$ to generate a control signal on the basis of the detected differences. The control signal is applied to the reception-side amplitude-phase correction circuit 10$n$ to carry out a feedforward control for the correction circuit 10$n$ so that the amplitude and phase characteristics thereof are corrected just by the differences, respectively.

Hereinafter, the second embodiment will be explained for only the dissimilarities with respect to the first embodiment. In the first embodiment described above, the reception-side amplitude-phase correction circuit 10n is feedback controlled by the reception-side error detector 13n so that the errors in amplitude and phase between the output signal from the reception-side amplitude-phase correction circuit 10n and the reference signal from the delay unit 14n becomes zeros. On the contrary, in the second embodiment, the differences in amplitude and phase between the output signal from the receiving unit 11n and the reference signal from the delay unit 14n are detected by the reception-side correction value estimator 20n to generate a control signal on the basis of the detected differences. The control signal is applied to the reception-side amplitude-phase correction circuit 10n, thereby carrying out the feedfoward control for correcting the amplitude and phase characteristics thereof just by the differences.

As a result, as well as the first embodiment, the respective amplitude and phase characteristics of the N reception systems become the same, viewed from the respective output terminals of the reception-side amplitude-phase correction circuits 10n. It should be noted that the operation of the reception system in the second embodiment is the same as that in the first embodiment.

Third Embodiment

Figure 5:
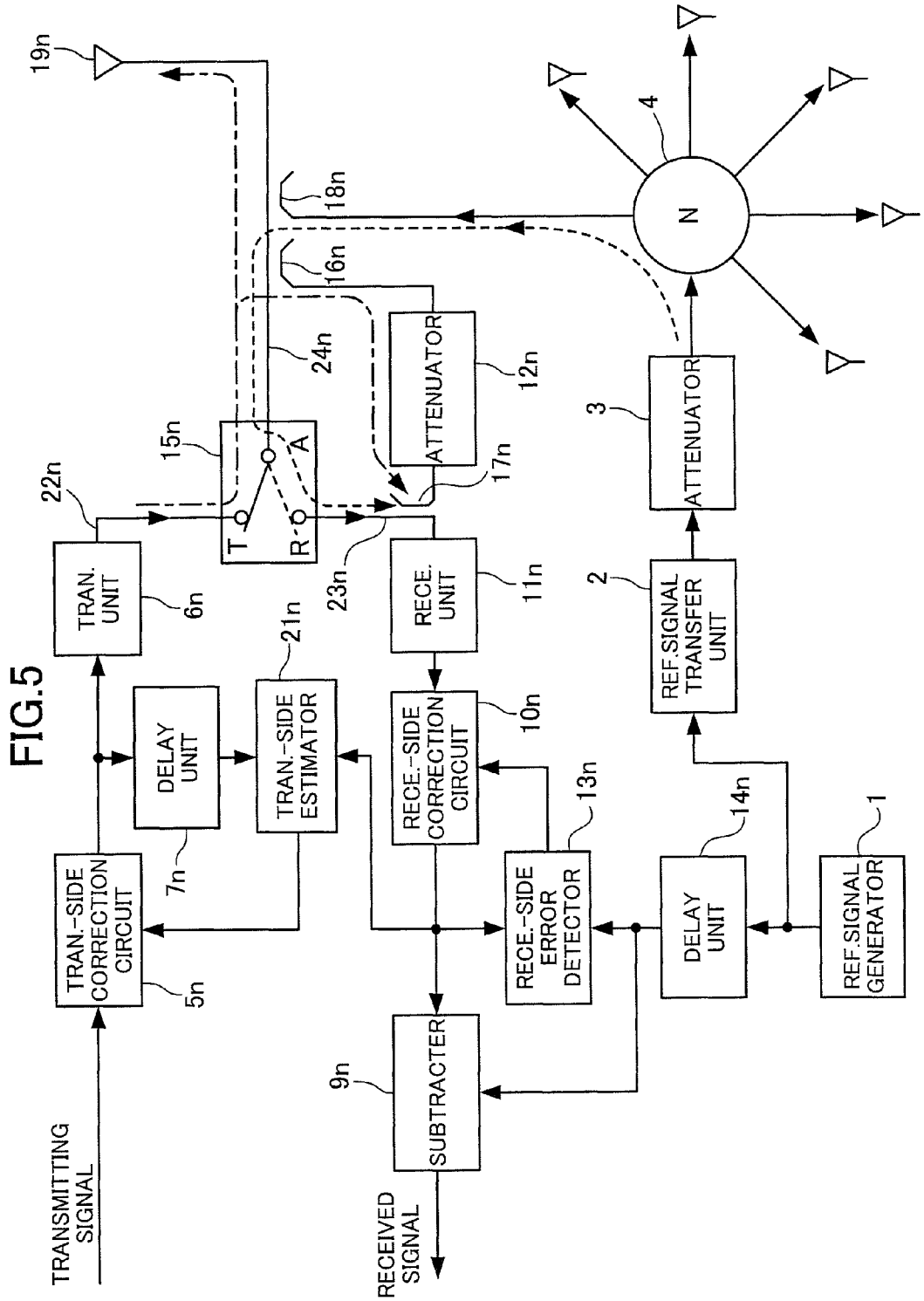
FIG. 5 shows a block diagram illustrating the third embodiment of the transmit-receive apparatus according to the present invention.

FIG. 5 shows the block diagram illustrating the third embodiment of the transmit-receive apparatus according to the present invention. The present embodiment is different from the first embodiment shown in FIG. 3 in that a transmission-side correction value estimator 21n is used in place of the transmission-side error detector 8n, and the output signal from the transmission-side amplitude-phase correction circuit 5n, i.e. the input signal to the transmitting unit 6n is applied to the delay unit 7n. The transmission-side correction value estimator 21n detects the differences in amplitude and phase between the output signal from the delay unit 7n and the output signal from the reception-side amplitude-phase correction circuit 10n to generate s control signal on the basis of the detected differences. The control signal is applied to the transmission-side amplitude-phase correction circuit 5n to carry out a feedforward control for the correction circuit 5n so that the amplitude and phase characteristics thereof is corrected just by the differences.

Hereinafter, the third embodiment will be explained for only the dissimilarities with respect to the first embodiment. In the first embodiment described above, the transmission-side amplitude-phase correction circuit 5n is feedback controlled by the transmission-side error detector 8n so that the errors in amplitude and phase between the output signal from the reception-side amplitude-phase correction circuit 10n and the output signal from the delay unit 7n becomes zeros. On the contrary, in the third embodiment, the differences in amplitude and phase between the output signal from the delay unit 7n and the output signal from the transmission-side amplitude-phase correction circuit 10n are detected by the transmission-side correction value estimator 21n to generate a control signal for the correction circuit 5n on the basis of the detected differences. The control signal is applied to the transmission-side amplitude-phase correction circuit 5n, thereby carrying out the feedfoward control for correcting the amplitude and phase characteristics thereof just by the differences.

As a result, it is appreciated that the respective amplitude and phase characteristics of the transfer paths from the input terminal of the transmission-side amplitude-phase correction circuits 5n to the output terminal of the reception-side amplitude-phase correction circuit 10n in the N systems are the same. In addition, the respective amplitude-phase characteristics of the transfer paths from the reception paths 23n to the output terminal of the reception-side amplitude-phase correction circuits 10n through the receiving units 11n in the N reception systems have been the same because of the correction at the time of the reception. Therefore, the respective amplitude-phase characteristics in the transfer paths from the input terminal of the transmission-side amplitude-phase correction circuits 5n to the transmission path 22n through the transmitting unit 6n in the N reception systems are the same. In this manner, the respective amplitude and phase characteristics of the reception system in the N sets of transmitting unit-receiving unit pair become the same, and the respective amplitude and phase characteristics of the transmission system in the N sets of transmitting unit-receiving unit pair become the same.

Fourth Embodiment

FIG. 6 shows the block diagram illustrating the fourth embodiment of the transmit-receive apparatus according to the present invention. The transmit-receive apparatus according to the fourth embodiment is constructed by combining the reception system in the second embodiment and the transmission system in the third embodiment. That is, the reception-side correction value estimator 20n and the transmission-side correction value estimator 21n are utilized in the fourth embodiment. The operation of the fourth embodiment can easily be understood from the second and third embodiments described above.

The embodiments of the time-division duplex transmit-receive apparatus according to the present invention have been described. In the respective embodiments, the reference signal generated by the reference signal generator is branched into N reference signals by the N-branching circuit to be applied to the N antenna transfer paths, respectively. The branched N reference signals applied to the N antenna transfer paths are respectively sent to the N receiving units at the same time when the N transmit-receive switching switches are respectively switched toward the reception systems. As a result, the branched reference signals can be respectively extracted from the N receiving units at the same time to compare with the reference signal generated by the reference signal generator in amplitudes and phases at the same time. Based on the comparison result, the amplitudes and phases characteristics can be corrected by the reception-side amplitude-phase correction circuit. Therefore, the present invention has an advantageous effect such that the amplitude and phase characteristics of all the N reception systems can be corrected at the same time.

Also, the correction for the transmission systems can be implemented in a following manner. The transmitting signals outputted from the N transmitting units are respectively extracted from the antenna transfer paths by the directional couplers, when the transmit-receive switching switches are switched toward the transmission systems. The extracted transmitting signal are respectively adjusted in level and applied to the reception paths by another directional couplers. The extracted transmitting signals applied to the reception transfer paths are respectively sent to the N reception systems which have been corrected. The extracted transmitting signals outputted from the N reception systems are respectively compared with the transmitting signals to be applied to the transmitting units in amplitudes and phases. Based on the comparison result, the amplitude and phase characteristics can be corrected by the transmission-side amplitude-phase correction circuit. Therefore, the present invention has an advantageous effect such that all the N transmission systems can be corrected in their amplitude and phase characteristics at the same time.

In addition, according to the transmit-receive apparatus of the present invention, the respective N sets of reception system and transmission system can be independently corrected. This means that the correction according to the present invention is not carried out by comparing a given set of transmitting unit-receiving unit pair with the reference set of transmitting unit-receiving unit pair like the conventional transmit-receive apparatus. As a result, switches are not required in a high frequency area which easily generates errors in amplitude and phase of the signal. Therefore, the present invention has an advantageous effects such that the problems due to such switches are not encountered.

The invention claimed is:

1. A time-division duplex transmit-receive apparatus, comprising:
an array antenna constituted by N antenna elements (N is an integer equal to or more than 2);
N sets of transmitting unit-receiving unit pair connected to the N antenna elements, respectively; and
correction means for correcting the N sets of transmitting unit-receiving unit pair at the same time so that respective amplitude and phase characteristics of reception systems in the N sets of transmitting unit-receiving unit pair become the same, and for correcting the N sets of transmitting unit-receiving unit pair at the same time so that respective amplitude and phase characteristics of transmission systems in the N sets of transmitting unit-receiving unit pair become the same.

2. A time-division duplex transmit-receive apparatus according to claim 1, wherein
the correction means includes,
reception system correcting means for correcting the N sets of transmitting unit-receiving unit pair at the same time so that respective amplitude and phase characteristics of reception systems in the N sets of transmitting unit-receiving unit pair become the same, and
transmission system correcting means for correcting the N sets of transmitting unit-receiving unit pair at the same time so that respective amplitude and phase characteristics of transmission systems in the N sets of transmitting unit-receiving unit pair become the same, and
each of the N sets of transmitting unit-receiving unit pair includes a transmit-receive switching switch for switching between the transmission system and the reception system to connect with the antenna element.

3. A time-division duplex transmit-receive apparatus according to claim 2, wherein
the reception system correcting means includes,
one reference signal generator for generating a reference signal,
one N-branching circuit for branching the reference signal into N reference signals,
a plurality of directional couplers, each provided in an antenna transfer path between the transmit-receive switching switch an the antenna element, for each coupling the reference signal branched by the N-branching circuit with the antenna transfer path,
a plurality of reception-side amplitude-phase correction circuits, each provided in the reception system, for each correcting the amplitude and phase of a signal to be inputted thereto, and
a plurality of reception-side error detectors for each detecting errors in amplitudes and phases between the reference signal through the N-branching circuit, the directional coupler, the antenna transfer path, the transmit-receive switching switch which is switched toward the reception system, and the reception-side amplitude-phase correction circuit, and the reference signal generated by the reference signal generator and delayed, and for each generating a control signal on the basis of the detected errors to be inputted to the reception-side amplitude-phase correction circuit, and
each of the reception-side amplitude-phase correction circuits corrects the amplitude and phase of the signal passing therethrough on the basis of the inputted control signal so that the errors become zeros, and
the transmission system correction means includes,
a plurality of transmission-side amplitude-phase correction circuits, each provided in the transmission system, for each correcting the amplitude and phase of a transmitting signal inputted thereto, and
a plurality of transmission-side error detectors, each provided in the transmission system, for detecting errors in amplitudes and phases between the transmitting signal passed through the transmission-side amplitude-phase correction circuit, the transmit-receive switching switch which is switched to the transmission system, the antenna transfer path, and the reception-side amplitude-phase correction circuit, and the transmitting signal which is to be inputted to the transmission-side amplitude-phase correction circuit and is delayed, and for each generating a control signal on the basis of the detected errors to be inputted to the transmission-side amplitude-phase correction circuit, and
each of the transmission-side amplitude-phase correction circuits corrects the amplitude and phase of the transmitting signal passing therethrough by the inputted control signal so that the errors become zeros.

4. A time-division duplex transmit-receive apparatus according to claim 3, further comprising a subtracter for subtracting the reference signal generated by the reference signal generator and delayed from the outputted signal of the reception-side amplitude-phase correction circuit.

5. A time-division duplex transmit-receive apparatus according to claim 2, wherein
the reception system correction means includes,
one reference signal generator for generating a reference signal,
one N-branching circuit for branching the reference signal into N reference signals,
a plurality of directional couplers, each provided in an antenna transfer path between the transmit-receive switching switch and the antenna element, for each coupling the reference signal branched by the N-branching circuit with the antenna transfer path,
a plurality of reception-side amplitude-phase correction circuits, each provided in the reception system, for each correcting the amplitude and phase of a signal to be inputted thereto, and
a plurality of reception-side error detectors for each detecting differences in amplitude and phase between the reference signal to be inputted to the reception-side amplitude-phase correction circuit through the N-branching circuit, the directional coupler, the antenna transfer path, and the transmit-receive switching switch which is switched toward the reception system, and the reference signal generated by the reference signal generator and delayed, and for each generating a control signal on the basis of the detected differences to be inputted to the reception-side amplitude-phase correction circuit, and
each of the reception-side amplitude-phase correction circuits corrects the amplitude and phase of the signal passing therethrough by the detected differences on the basis of the inputted control signal, and
the transmission system correction means includes,
a plurality of transmission-side amplitude-phase correction circuits, each provided in the transmission system, for each correcting the amplitude and phase of a transmitting signal inputted thereto, and
a plurality of transmission-side error detectors, each provided in the transmission system, for detecting errors in amplitude and phase between the transmitting signal passed through the transmission-side amplitude-phase correction circuit, the transmit-receive switching switch which is switched to the transmission system, the antenna transfer path, and the reception-side amplitude-phase correction circuit, and the transmitting signal which is to be inputted to the transmission-side amplitude-phase correction circuit and is delayed, and for each generating a control signal on the basis of the detected errors to be inputted to the transmission-side amplitude-phase correction circuit, and each of the transmission-side amplitude-phase correction circuit corrects the amplitude and phase of the transmitting signal passing therethrough by the inputted control signal so that the errors become zeros.

6. A time-division duplex transmit-receive apparatus according to claim 2, wherein the reception system correction means includes, one reference signal generator for generating a reference signal, one N-branching circuit for branching the reference signal into N reference signals, a plurality of directional couplers, each provided in an antenna transfer path between the transmit-receive switching switch and the antenna element, for each coupling the reference signal branched by the N-branching circuit with the antenna transfer path, a plurality of reception-side amplitude-phase correction circuits, each provided in the reception system, for each correcting the amplitude and phase of a signal to be inputted thereto, and a plurality of reception-side error detectors for each detecting errors in amplitudes and phases between the reference signal through the N-branching circuit, the directional coupler, the antenna transfer path, the transmit-receive switching switch which is switched toward the reception system, and the reception-side amplitude-phase correction circuit, and the reference signal generated by the reference signal generator and delayed, and for each generating a control signal on the basis of the detected errors to be inputted to the reception-side amplitude-phase correction circuit, and each of the reception-side amplitude-phase correction circuit corrects the amplitude and phase of the signal passing therethrough on the basis of the inputted control signal so that the errors become zeros, and the transmission system correction means includes, a plurality of transmission-side amplitude-phase correction circuits, each provided in the transmission system, for each correcting the amplitude and phase of a transmitting signal inputted thereto, a plurality of transmission-side error detectors, each provided in the transmission system, for each detecting differences in amplitude and phase between the transmitting signal passed through the transmission-side amplitude-phase correction circuit, the transmit-receive switching switch which is switched to the transmission system, the antenna transfer path, and the reception-side amplitude-phase correction circuit, and the transmitting signal outputted from the transmission-side amplitude-phase correction circuit and delayed, and for each generating a control signal on the basis of the detected differences to be inputted to the transmission-side amplitude-phase correction circuit, and each of the transmission-side amplitude-phase correction circuits corrects the amplitude and phase of the transmitting signal passing therethrough by the detected differences on the basis of the inputted control signal.

7. A time-division duplex transmit-receive apparatus according to claim 2, wherein the reception system correction means includes, one reference signal generator for generating a reference signal, one N-branching circuit for branching the reference signal into N reference signals, a plurality of directional couplers, each provided in an antenna transfer path between the transmit-receive switching switch and the antenna element, for each coupling the reference signal branched by the N-branching circuit with the antenna transfer path, a plurality of reception-side amplitude-phase correction circuits, each provided in the reception system, for each correcting the amplitude and phase of a signal to be inputted thereto, and a plurality of reception-side error detectors for each detecting differences in amplitude and phase between the reference signal to be inputted to the reception-side amplitude-phase correction circuit through the N-branching circuit, the directional coupler, the antenna transfer path, and the transmit-receive switching switch which is switched toward the reception system, and the reference signal generated by the reference signal generator and delayed, and for each generating a control signal on the basis of the detected differences to be inputted to the reception-side amplitude-phase correction circuit, and each of the reception-side amplitude-phase correction circuits corrects the amplitude and phase of the signal passing therethrough by the detected differences on the basis of the inputted control signal, and the transmission-side amplitude-phase correction circuit corrects the amplitude and phase of the transmitting signal passing therethrough by the differences on the basis of the inputted control signal, the transmission system correction means includes, a plurality of transmission-side amplitude-phase correction circuits, each provided in the transmission system, for each correcting the amplitude and phase of a transmitting signal inputted thereto, and a plurality of transmission-side error detectors, each provided in the transmission system, for each detecting differences in amplitude and phase between the transmitting signal passed through the transmission-side amplitude-phase correction circuit, the transmit-receive switching switch which is switched to the transmission system, the antenna transfer path, and the reception-side amplitude-phase correction circuit, and the transmitting signal outputted from the transmission-side amplitude-phase correction circuit and delayed, and for each generating a control signal on the basis of the detected differences to be inputted to the transmission-side amplitude-phase correction circuit, and each the transmission-side amplitude-phase correction circuits corrects the amplitude and phase of the transmitting signal passing therethrough by the detected differences on the basis of the inputted control signal.

* * * * *